US012138600B2

(12) United States Patent
Fantappie et al.

(10) Patent No.: US 12,138,600 B2
(45) Date of Patent: Nov. 12, 2024

(54) METHOD AND APPARATUS FOR INSTANTANEOUS ON-LINE CARBONATION OF WATER THROUGH ELECTROSTATIC CHARGING

(71) Applicant: PepsiCo, Inc., Purchase, NY (US)

(72) Inventors: Giancarlo Fantappie, Rancho Palos Verdes, CA (US); Farshad Kamali, Beverly Hills, CA (US); Diego Macrellino, Torrance, CA (US); Joey Miyamoto, Torrance, CA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/695,416

(22) Filed: Mar. 15, 2022

(65) Prior Publication Data

US 2022/0203311 A1 Jun. 30, 2022

Related U.S. Application Data

(63) Continuation of application No. 16/329,043, filed as application No. PCT/US2017/051225 on Sep. 12, 2017, now Pat. No. 11,318,427.

(Continued)

(51) Int. Cl.
*B01F 23/236* (2022.01)
*B01F 23/232* (2022.01)
(Continued)

(52) U.S. Cl.
CPC ........ *B01F 23/236* (2022.01); *B01F 23/2323* (2022.01); *B01F 25/3121* (2022.01);
(Continued)

(58) Field of Classification Search
CPC ................ B01F 23/236; B01F 23/2323; B01F 23/237612; B01F 25/3121;
(Continued)

(56) References Cited

U.S. PATENT DOCUMENTS 2,132,011 A 10/1938 Bennett et al.
2,195,449 A 4/1940 Delen
(Continued)

FOREIGN PATENT DOCUMENTS

CN 105011764 A1 11/2015
CN 203016682 U 6/2023
(Continued)

OTHER PUBLICATIONS

International Search Report for Method and Apparatus for Instantaneous On-Line Carbonation of Nater Through Electrostatic Charging, International App. No. PCT/US2017/051225, Applicant Sun Desert Corp.

*Primary Examiner* — Charles S Bushey
(74) *Attorney, Agent, or Firm* — Sterne, Kessler, Goldstein & Fox P.L.L.C.

(57) ABSTRACT

Carbonation apparatus is provided for carbonating a mixed input flow of pressurized and refrigerated carbon dioxide and water. A first cartridge is disposed within the carbonation chamber, defining a porous micromesh net in fluid communication with the input flow and a central cavity in fluid communication with the carbonation chamber output port. The micromesh net is configured to break up chains of water molecules passing through the net, to enhance bonding between the water and carbon dioxide molecules within the cartridge. The net also responds to the flow of water and carbon dioxide molecules impacting and passing through the net by generating a passive polarizing field that has a polarizing influence on the water molecules to further enhance bonding. Beads may be provided within the cartridge for capturing and stabilizing carbon dioxide molecules to yet further enhance bonding between the water and the carbon dioxide molecules.

20 Claims, 11 Drawing Sheets

Related U.S. Application Data

(60) Provisional application No. 62/393,604, filed on Sep. 12, 2016.

(51) Int. Cl.

| | |
|---|---|
| ***B01F 25/312*** | (2022.01) |
| ***B01F 25/452*** | (2022.01) |
| ***B01F 33/81*** | (2022.01) |
| ***B01F 33/82*** | (2022.01) |
| ***B67D 1/00*** | (2006.01) |
| ***B67D 1/04*** | (2006.01) |
| *B01F 23/237* | (2022.01) |
| *B01F 33/05* | (2022.01) |
| *B01F 101/14* | (2022.01) |

(52) U.S. Cl.
CPC .. *B01F 25/45231* (2022.01); *B01F 25/45241* (2022.01); *B01F 33/811* (2022.01); *B01F 33/821* (2022.01); *B67D 1/0058* (2013.01); *B67D 1/04* (2013.01); *B01F 23/237621* (2022.01); *B01F 33/052* (2022.01); *B01F 33/053* (2022.01); *B01F 2101/14* (2022.01)

(58) Field of Classification Search
CPC .......... B01F 25/45231; B01F 25/45241; B01F 33/052; B01F 33/053; B01F 33/811; B01F 33/821; B01F 2101/14; B67D 1/0058; B67D 1/04
See application file for complete search history.

(56) References Cited

U.S. PATENT DOCUMENTS

| | | | | |
|---|---|---|---|---|
| 2,519,533 | A | 8/1950 | Arnett | |
| 2,527,659 | A | 10/1950 | Smith | |
| 2,899,170 | A | 8/1959 | Cornelius | |
| 3,761,066 | A | 9/1973 | Wheeler | |
| 3,861,652 | A | 1/1975 | Clark et al. | |
| 5,460,846 | A | 10/1995 | Stumphauzer et al. | |
| 5,749,233 | A | 5/1998 | Adolfsson | |
| 6,041,970 | A | 3/2000 | Vogel | |
| 6,161,819 | A | 12/2000 | Edwards | |
| 6,405,900 | B1 | 6/2002 | Kown | |
| 8,177,197 | B1 | 5/2012 | Ergican | |
| 8,567,767 | B2 | 10/2013 | Fantappie | |
| 8,636,268 | B2 | 1/2014 | Fantappie | |
| 9,107,448 | B2 | 8/2015 | Giardino et al. | |
| 11,318,427 | B2 * | 5/2022 | Fantappie | B01F 25/3121 |
| 11,413,587 | B2 * | 8/2022 | Van De Sluis | B67D 1/007 |
| 11,612,864 | B2 * | 3/2023 | Yang | B01F 23/2363 261/78.1 |
| 2003/0168754 | A1 | 9/2003 | Spiegel et al. | |
| 2005/0230415 | A1 | 10/2005 | Forgac et al. | |
| 2007/0023935 | A1 | 2/2007 | Robards, Jr. et al. | |
| 2008/0248164 | A1 | 10/2008 | Spiegel | |
| 2010/0133708 | A1 | 6/2010 | Fischer | |
| 2012/0178629 | A1 * | 7/2012 | Hudson | A61P 17/18 977/773 |
| 2014/0239519 | A1 * | 8/2014 | Erigican | B67D 1/1461 261/76 |
| 2014/0284822 | A1 | 9/2014 | Fantappie | |
| 2015/0273413 | A1 | 10/2015 | Choi et al. | |
| 2017/0113954 | A1 | 4/2017 | Stoppelbein | |
| 2020/0361758 | A1 | 11/2020 | Fantappie et al. | |

FOREIGN PATENT DOCUMENTS

| | | | |
|---|---|---|---|
| DE | 20307153 | U1 | 9/2003 |
| DE | 102007014611 | A1 | 9/2008 |
| DE | 102012102467 | A1 | 9/2013 |
| JP | S52-058098 | U | 4/1977 |
| JP | S52-058099 | U | 4/1977 |
| JP | H08-323175 | A | 12/1996 |
| JP | 2002529221 | A | 9/2002 |
| JP | 2009531168 | A | 9/2009 |
| JP | 2013529130 | A | 7/2013 |
| JP | 2014025905 | A | 2/2014 |
| JP | 2015533648 | A | 11/2015 |
| TW | 201431520 | A | 8/2014 |
| WO | 2001/03817 | A1 | 1/2001 |
| WO | 2008/125896 | A1 | 10/2008 |

* cited by examiner

| Highly Carbonated Bottles of Water | ARROWHEAD | Perrier | CRYSTAL GEISER |
|---|---|---|---|
| Types of sparkling water | sparkling original | sparkling | sparkling springwater |
| Type of package | PET Bottle | Glass Bottle | PET Bottle |
| TDS (ppm) | 116 | 385 | 384 |
| ATC pH (Hanna) | 4.72 | 5.12 | 5.36 |
| ATC ORP (mV) | 123.1 | 98.2 | 88.3 |
| Carb CO2 Vol (%) (Terrriss) | 3.9 | 3.6 | 3.6 |
| AFTER 30' with sample kept in ice but opened | | | |
| Carb CO2 Vol (%) Terrriss | 3.3 | 2.9 | 3.2 |
| AFTER 30' with sample kept open at room temperature (81 F) | | | |
| Carb CO2 Vol (%) Terrriss | 2.0 | 2.1 | 2.8 |
| AFTER 1 hour with sample kept open at room temperature (81 F) | | | |
| Carb CO2 Vol (%) Terrriss | Below 2.0 | 2.0 | Below 2.0 |

Fig. 11a

| Best Carbonators | Polarizing Carbonator | apiqe Enhanced | apiqe Universal |
|---|---|---|---|
| Refrigeration system | standard ice-bank technology | | |
| Filtration system | multi-stage filtration + R.O. | | actifilter® |
| Water inlet TDS (ppm) | <10 | | 336 |
| Water inlet pH | 5.52 | | 6.75 |
| Water inlet ORP (mV) | 79.3 | | 14.5 |
| Water inlet Temp (F) | 82 | | |
| Water inlet Press (psi) | 60 | | |
| CO2 inlet pressure (psi) | 70 | 110 | 105 |
| Sparkling Water dispensing Temp (F) | 37 | 37 | 37 |
| ATC pH of sparkling water (Hanna) | 3.65 | 3.71 | 4.7 |
| ATC ORP (mV) of sparkling water | 177.2 | 174 | 120.7 |
| CO2 Vol (%) of sparkling water (Terrriss) | 4.3 | 4.3 | 3.8 |
| AFTER 30' with sample kept in ice but opened | | | |
| Carb CO2 Vol (%) Terrriss | 3.7 | 3.7 | 3.1 |
| AFTER 30' with sample kept open at room temperature (81 F) | | | |
| Carb CO2 Vol (%) Terrriss | 3.4 | 3.0 | 2.6 |
| AFTER 1 hour with sample kept open at room temperature (81 F) | | | |
| Carb CO2 Vol (%) Terrriss | 3.0 | 2.3 | 2.3 |

Fig. 11b

METHOD AND APPARATUS FOR INSTANTANEOUS ON-LINE CARBONATION OF WATER THROUGH ELECTROSTATIC CHARGING

CROSS-REFERENCE TO RELATED APPLICATIONS

The application is a continuation of U.S. patent application Ser. No. 16/329,043, filed Feb. 27, 2019, now U.S. Pat. No. 11,318,427, which application claims benefit of International Application No. PCT/US2017/51225, filed Sep. 12, 2017, which application claims benefit under 35 U.S.C. § 119(e) to U.S. Provisional Patent Application No. 62/393,604 filed Sep. 12, 2016, each of which applications are incorporated herein by reference in their entireties.

STATEMENT RE: FEDERALLY SPONSORED RESEARCH/DEVELOPMENT

Not Applicable

BACKGROUND

The present invention is directed to a method and apparatus for enhancing carbonation of drinking water and drinking beverages, resulting in carbonated water and carbonated drinking beverages (by mixing carbonated water with syrups). Carbonated water and other carbonated drinks are typically formed by combining pressurized chilled water (H2O) and carbon dioxide (CO2) within a metal chamber; or in a few cases, instantaneously mixing them on-line, at a point of dispensation.

When the carbonated drink is produced at a beverage production facility, the resulting carbonated beverage is dispensed in bottles, cans, or other containers for distribution. Some beverages are produced with higher level of carbonation than others. Level of carbonation varies from beverage to beverage. The level of carbonation may be a function of consumer taste. It may also be influenced by a desire to maintain the carbonation at a certain level over a period of time. In consideration of the longevity of CO2 in beverages, it is known that certain PET (Polyethylene Terephthalate) containers (e.g., plastic bottles in which carbonated beverages are contained), leak carbon dioxide from their walls over time, therefore drastically reducing the duration of carbonation in beverages. This happens because, initially the carbonated beverage is kept under pressure; and once a bottle or a can is opened, the carbonation will begin to decrease as carbon dioxide bubbles are dissipated from the beverage very quickly due to atmospheric pressure and at ambient temperature. The same is true with a point-of-use dispenser (e.g., a soda fountain) which combines, at high pressures, the carbon dioxide with the refrigerated water to generate highly carbonated water, and mixes the highly carbonated water with syrups inside the dispensing nozzle (e.g., post-mix dispenser).

It is well known that the solubility of carbon dioxide gas in water is fixed at 25° C. and atmospheric pressure. Under these boundary conditions, only a small fraction of CO2 in water exists as carbonic acid and the majority of CO2 in water is not converted to acid and remains as CO2 (aq), i.e., the CO2 (aq) is not bonded to the water and can rapidly be released from the water. To increase the amount of CO2 dissolved in water (in the event that sparkling water must be generated) the Food and Beverage Industry has developed a process using water refrigerated, at low temperature, that is mixed with gas under high pressure. In fact, mixing water with carbon dioxide at temperatures close to water freezing (0° C./32° F.), dramatically increases the amount of carbon dioxide (CO2 aq) that is retained in (chilled) water. By increasing the carbon dioxide gas pressure while mixing it with highly pressurized (chilled) water is an additional step that is commonly used by the Food and Beverage Industry to amplify the carbonation level in beverages. Consequently, when producing carbonated water, low temperatures (close to water freezing, 0° C.) and high pressures (over 400 pounds per square inch (psi)) of both liquid and gas are the solutions currently used in beverage production plants as well as in point-of-use post-mix beverage dispensers.

In typical carbonated beverages, gas bubbles quickly form when the beverage is dispensed. Under atmospheric pressure and at room temperature, gas (CO2) bubbles grow inside the water solution until they are quickly released from the surface of the beverage, resulting in a “flat” beverage in relatively short amount of time. In order to produce highly carbonated water suitable for drinking in an open glass, it is necessary to dissolve a larger quantity of carbon dioxide gas in water, and to avoid the gas quickly dissolving in the atmosphere.

The electrical bond between water (H2O) molecules and the carbon dioxide (CO2) molecules is understood to be a dominant factor in the ability to maintain the amount of carbon dioxide inside the water (in a form of carbonic acid). This bond assists in allowing sparkling water to retain its carbonation level for a longer period of time after being dispensed. Unfortunately, that bonding between H2O and CO2 molecules is known to be very weak (i.e., water molecules prefer to bond to each other rather than with carbon dioxide molecules). In general, an equilibrium condition exists when a chemical reaction (CO2/H2O bonding) and its reverse reaction (CO2/H2O separation) occur at equal rates. That equilibrium is typically determined by the partial pressure of CO2 (gas) on the water.

Both water and carbon dioxide molecules are polarized molecules. As described below, the present invention is directed to a method and apparatus whereby, in addition to the use of conventional (low) temperatures and (high) pressures to provide carbonating, the extended chains of water molecules are broken up, and the natural polarization of the molecules of water and carbon dioxide is also increased to enhance the bonding between water (H2O) molecules and carbon dioxide (CO2) molecules. This produces more highly carbonated water, which retains its carbonation level for a more extended period of time.

Enhancing the polarization property of the molecules of water and carbon dioxide allows the molecules to be more readily oriented for greater bonding, particularly in combination with providing a substrate to which the molecules (particularly carbon dioxide molecules may be captured for facilitating bonding activity. The water solution can then be carbonated to a higher level and retain that elevated level of carbonation for a longer time after being dispensed.

By electrostatically charging and orienting the polarizations of the water molecules, and to a lesser extent the carbon dioxide molecules, a greater number of chemical bonds between the two molecules is generated, resulting in higher levels of carbonic acid (H2CO3 concentration) is present in the water which, in turn, translates to a lower level of pH in the resulting sparkling water. For example, in pure water the Bjerrum plot shows a pH of 5.7 under atmospheric conditions. By enhancing the orientation of the polarized molecules, more dipole bonds are formed between water and carbon dioxide molecules, resulting in a sparkling water with a pH that can reach 3.6 pH or less, under atmospheric pressure (pCO2=1 atm). This same low value of pH is equivalent to a level that would normally result at a much higher CO2 pressure level, i.e., in a Bjerrum plot, to a pCO2 level exceeding 5 bars.

As described further below, the present invention provides a methodology and apparatus for enhancing the bonding between the carbon dioxide and water molecules by, inter alia, mitigating bonds among the water molecules, polarizing the water molecules and then orienting the water molecules so that carbon dioxide molecules have a higher probability of bonding with the more water molecules.

BRIEF SUMMARY

Carbonation apparatus is provided for carbonating a mixed input flow of pressurized and refrigerated carbon dioxide and water. A first cartridge is disposed within the carbonation chamber, defining a porous micromesh net in fluid communication with the input flow and a central cavity in fluid communication with the carbonation chamber output port. The micromesh net is configured to break up chains of water molecules passing through the net, to enhance bonding between the water and carbon dioxide molecules within the cartridge. The net also responds to the flow of water and carbon dioxide molecules impacting and passing through the net by generating a passive polarizing field that has a polarizing influence on the water molecules to further enhance. Beads may be provided within the cartridge for capturing and stabilizing carbon dioxide molecules to yet further enhance bonding between the water and the carbon dioxide molecules.

Multiple carbonation chambers may be utilized, generally in a serial arrangement.

In one embodiment the carbonation apparatus is implemented as a pair of carbonation chambers, with the first carbonation chamber including a cylindrical micromesh net and the second carbonation chamber including a plurality of beads disposed therein.

In another embodiment both carbonation chambers include an associated micromesh net within the carbonation chamber, with the plurality of beads disposed within the area defined by the micromesh net. The net and the beads may be of similar or different sizes.

In one embodiment the carbonation chambers defining the internal volume of between 2 to 400 $cm^3$.

The micromesh nets may be formed of stainless steel strands, of between 2 to 100μ in diameter, and defining an open mesh area of between 5 to 800$\mu^2$.

In one embodiment the first carbonation chamber includes a cartridge defining a 100μ micromesh net, housing the 5 mm diameter beads, where the second carbonation chamber includes a cartridge defining a 400μ mesh net and beads having a diameter between 0.5 and 3 mm.

The input flow to the carbonation apparatus is expected to be the pressure of approximately 160 psi and a flow of 1.5 gallons per minute (GPM). The input to the second carbonation chamber may be at a lower pressure of 65 psi and a lower flow rate of 1.1 GPM.

A fluid flow compensator may be provided at the output of the carbonation chambers, for reducing the pressure and flow rate from the carbonation chambers to a pressure suitable for dispensation, e.g., a pressure of 15 psi and a flow rate of 0.5 to 1 GPM.

BRIEF DESCRIPTION OF THE DRAWINGS

These and other advantages and features of the invention will be better appreciated in view of the following drawings and descriptions in which like numbers refer to like parts throughout, and in which:

FIGS. 11*a* and 11*b* are tables of measured carbonation parameters associated with one embodiment of the present invention, in comparison to contemporary carbonation systems and bottled carbonated water;

DETAILED DESCRIPTION

In general, the present invention modifies previously existing techniques and apparatus for the enhancement of carbonation of water or other beverages (i.e. utilizing low temperature and high pressure) with the addition of the techniques and apparatus as described below. Such modified techniques and apparatus are directed toward breaking the molecular structure of water compounds, while orienting polarized molecules of water and carbon dioxide to enhance and multiply the bonds between carbon dioxide and water molecules as described in more detail below. In the described embodiments, the techniques and apparatus are primarily designed and optimized for use in conjunction with a point of use soda/sparkling water dispenser.

Figure 1:
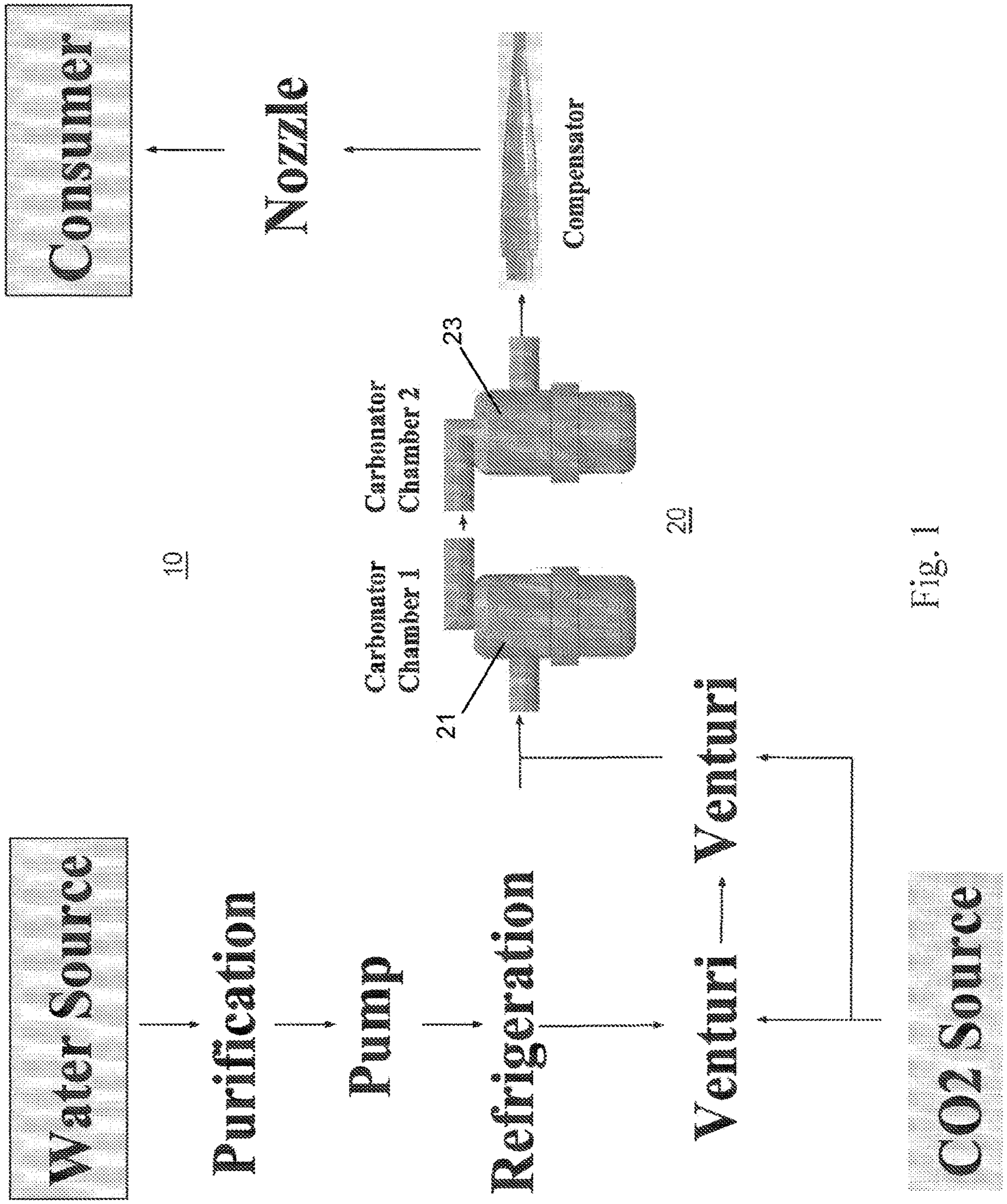
FIG. 1 is a block diagram illustrating an exemplary water carbonation process and system in accordance with one embodiment of the invention.
Figure 2:
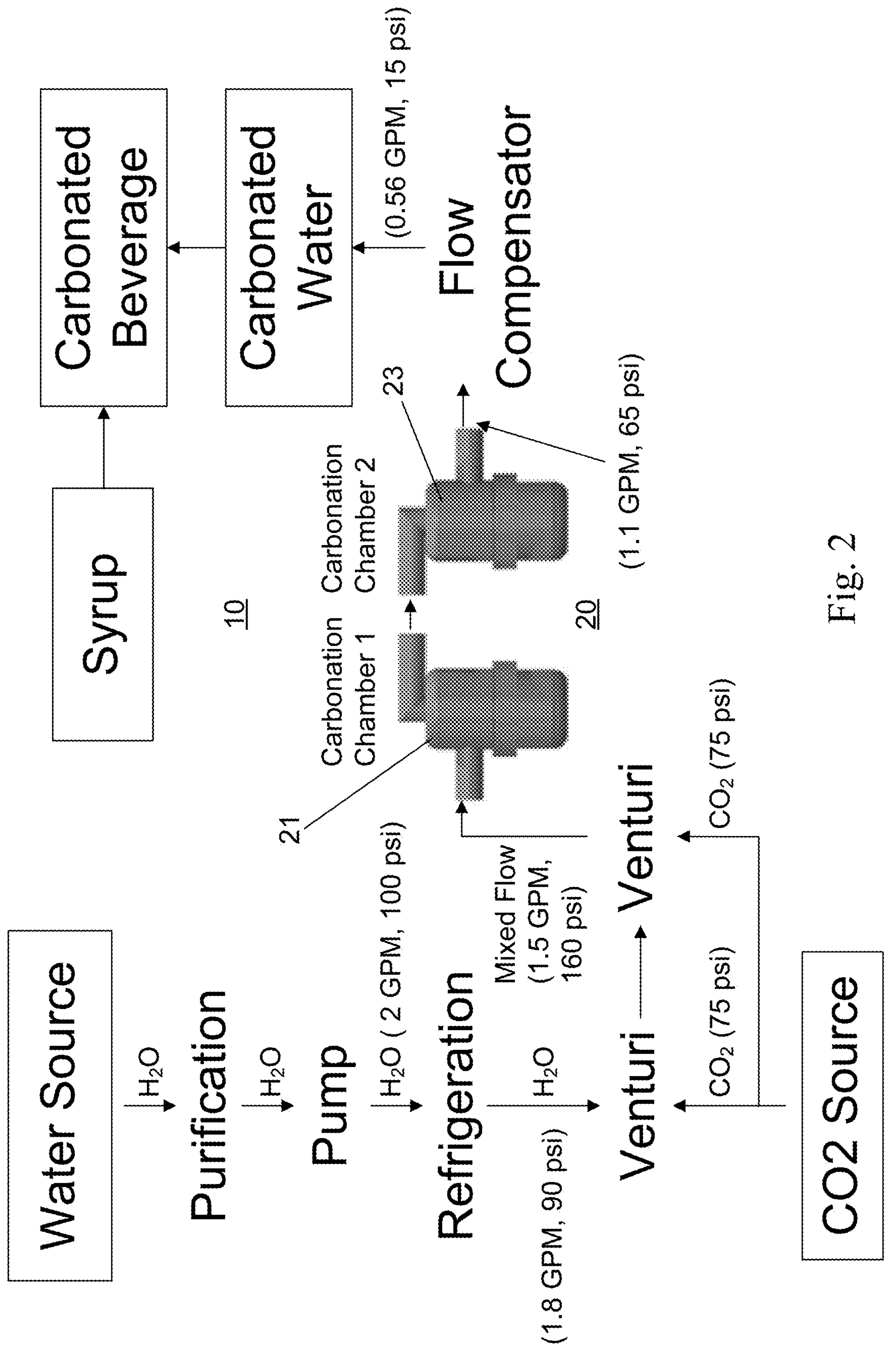
FIG. 2 repeats the block diagram of FIG. 1, showing exemplary pressure and flow levels throughout the system and process.

In accordance with the present invention, water is carbonated by the process and using a system generally shown in FIGS. 1 and 2. Drinking water is brought in from an outside source (water supply) and is purified to minimize the total dissolved solids. Reduction of dissolved solids is also effective to coalesce carbon dioxide bubbles and reduce carbonic acid concentration. Purifying the source water further aids in the mitigation of the bond between the water molecules and the carbon dioxide molecules. The purified water is then pressurized (with a water pump) and refrigerated (inside a refrigerator) to approximately freezing temperature. In the present embodiment, the water pump delivers water at a flow rate between 0.2 and 5 GPM.

Figure 3:
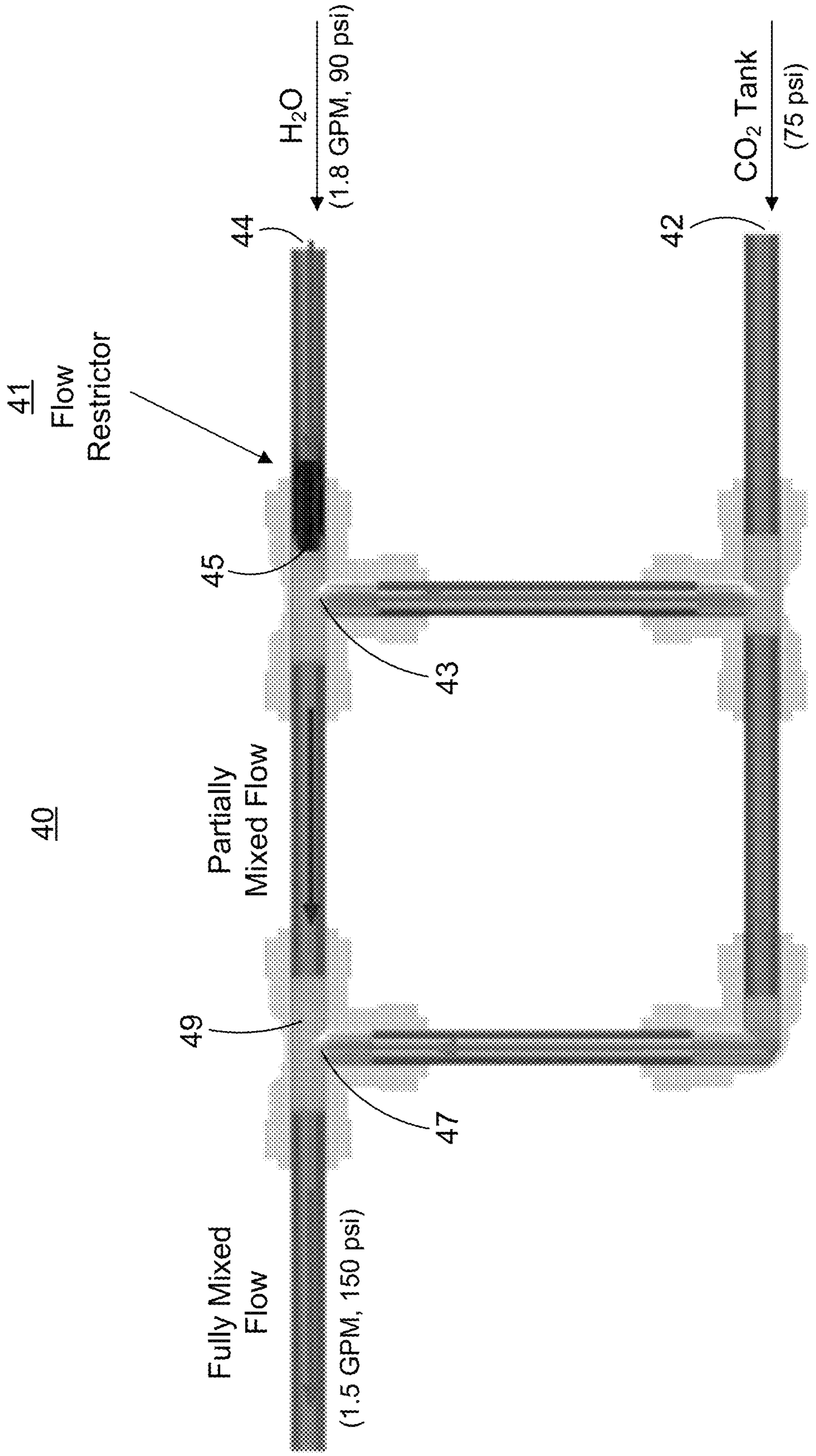
FIG. 3 illustrates an exemplary H2O and CO2 mixing apparatus.

In accordance with the carbonation apparatus 10, shown at FIGS. 1-3, streams of refrigerated liquid water and carbon dioxide gas under pressure (between 40 and 100 psi) are introduced at respective inlets 44 and 42, and then combined in mixing apparatus 40 (shown at FIG. 3) that preferably creates an interference at the intersection of the streams, causing the generation of a low-pressure area adjacent the point(s) of merger, which results in a Venturi effect. The Venturi effect enhances the flow of carbon dioxide molecules into the mixing apparatus 40. As shown in FIG. 3, one or more (in-line) flow restrictors 41 may be used to create the Venturi effect(s), for enhancing the absorption of the carbon dioxide gas into the flowing water.

Carbon dioxide nozzle(s) 43, 47 and water nozzle(s) 45, 49 are provided at the intersection of the streams and oriented substantially perpendicular to each other, to cause a low-pressure area to be created downstream from the point where the carbon dioxide and water merge. As noted above, the low-pressure area creates a Venturi effect, enhancing the flow of the carbon dioxide and water and facilitating the mixing of the carbon dioxide and water molecules to initial carbonation levels prior to entry into the carbonation chamber(s).

The enhanced mixture of the water and carbon dioxide facilitates the functionality of the carbonation chamber(s) by stabilizing the flow into the first carbonation chamber, avoiding multiple laminar flows that may mitigate the bonding of the water and carbon dioxide molecules in the first carbonation chamber.

In another alternate embodiment, a water supply nozzles 45, 49 and the carbon dioxide supply nozzles 43, 47 are oriented such that one or more of the nozzle(s) (e.g., the carbon dioxide nozzle 43, 47 is oriented to have a leading-edge that substantially coincides with the flow axis from the associated water nozzle 45, 49. That leading-edge may further be rounded and canted away from the flow of the pressurized water to enhance the flow across the face of the canted carbon dioxide nozzle resulting in a more defined low-pressure area. This permits a higher regulation of the Venturi, and therefore the flow, in response to adjustment of the pressure of the water impacting upon the canted carbon dioxide nozzle.

As further shown in FIGS. 1-3, the mixture of water and gas flowing out of the mixing chambers is then passed through one or more carbonation chambers 21, 23. In various embodiments of carbonation chamber(s), shown more particularly at FIGS. 4-7, the carbonation chambers function to breakup chains of water molecules; to enhance orientation of the molecules relative to the flow through the carbonation; and to capture molecules in a more stabilized position when they are more available for bonding with other molecules. As described in more detail below, the water molecules may be polarized to be more oriented, e.g., with hydrogen atoms directed in the direction of flow, towards the captured carbon dioxide molecules. This facilitates enhanced bonding between the water and carbon dioxide molecules, producing high levels of carbonation in the water.

As shown at FIGS. 4-7, one or more of the carbonization chambers 21, 23 is provided with a metal micromesh net 34 configured and sized to breakup extended chains of molecules, e.g., water molecules, by virtue of physical impact into micromesh netting. That breakup produces more water molecules available for bonding with carbon dioxide molecules in the course of the flow, to further enhance bonding between water molecules and carbon dioxide molecules. The molecules may further be directed to a body or array of glass beads (FIG. 4*b*), which may be disposed in the carbonation chamber(s) 21, 23, having a micromesh net, as shown at FIGS. 4*b* and 6*b*, or in a separate chamber, as shown at FIG. 4*a*. The beads include micro irregularities, into which the molecules, particularly the larger carbon dioxide molecules, may become trapped. The carbon dioxide molecules, stabilized on the irregular surface of the beads are then substantially more stationary targets for the smaller water molecules, which may then bond to the carbon dioxide to form carbonic acid, which may then be released into the flow out of the carbonation chamber. The resulting level of bonding between water and stabilized carbonation molecules has been found to be substantially higher than would normally be the case where the water and carbon dioxide molecules are combined by simply pumping carbon dioxide in pressurized, refrigerated water. Moreover, such pumping alone has been found to create a looser form of carbonation, where more carbon dioxide is in an aqueous mixture, i.e., not effectively bonded with the water molecules such that the carbonation more readily dissipates over time.

As noted above, bonding between the carbon molecules and the water molecules may, in accordance with the present invention, be further enhanced by polarization of the molecules, so that the molecules are better oriented for bonding. Such orientation may be done in various ways. In one embodiment of the present invention, orientation of the molecules is effected as a result of a polarized magnetic field passively created on the micromesh grid, as a consequence of the activity of the hydrogen molecules and carbon dioxide molecules as they impact, break up and pass through the micromesh net. Such passive polarization of the micromesh net is understood to result in stripping away electrons from the upstream surface of the micromesh net (e.g., which may be formed of stainless steel), creating a small temporary positive charge on the upstream surface of the net, with a more negative charge on the downstream side of the netting. Such an induced polarization is believed to occur in a manner similar to that which occurs when a glass rod is rubbed with a silk cloth, stripping some electrons from the surface of the glass rod and temporarily giving the glass rod a positive charge.

As the water molecules pass through the micromesh net, the charge on the net is believe to influence water molecules to be oriented with the more positively charged oxygen atom to be oriented towards the net and the less positively charged hydrogen atom to be oriented away from the net, i.e., towards the direction of flow, for bonding with the carbon dioxide molecules in the flow and/or captured and stabilized on the surface of the beads. Such passive polarization, created as a consequence of the interaction of the molecules and the net, thereby enhances the dipole bonding between the water and carbon dioxide molecules.

Alternatively, the micromesh net may be implemented as a pair of concentric nets connected to a voltage source, to provide active polarization of the nets to enhance orientation of the water molecules passing through the net. As will apparent to those of ordinary skill in the art, the particular orientation of current flow through the nets may be implemented in accordance with the desired polarization of the water molecules as they pass through the nets.

As indicated above, the first carbonation chamber may include the micromesh net, through which the input water and gas mix passes, is preferably formed of one or more independent rings of micromesh metal, such as stainless steel. The passage of the carbonated water through the micromesh net, breaks the long molecule compounds of water while creating a weak electrostatic field due to the high-speed passage of more polarized molecules which, within a short period of time (less than one second) the more polarized molecules of the fluid mix (water and carbon dioxide) so the short (broken) chains of water molecules have a higher likelihood of forming dipole to dipole electrostatic connections with the carbon dioxide molecules. In the present embodiment, static electric fields are self-induced by the passage of polarized molecules: creating electrical induction. Other embodiments of the same apparatus may utilize a process in which electric fields are artificially generated externally, through a common DC power supply, or multiple DC power supplies, resulting in highly polarized water and gas molecules that are immediately oriented, in accordance with the electrical field generated on the net. Whichever is the solution adopted (induced electrical field or artificially generated), the result is high polarization and orientation of the molecules of liquid and gas. In case of passively induced electrical fields, not only does the induced static electric field contribute to the polarization of molecules transiting within, but the polarization itself modifies the electric field that is generated.

Although the electrostatic field herein generated by the passage of polarized molecule is expected to be relatively weak, the resulting increase in the polarization of water molecules increases the likelihood of the formation of bonds between the water molecules and the carbon dioxide molecules. This is because as the degree of polarization of each water molecule is increased the total number of water molecules with a high degree of polarization is increased. By breaking the long chains of molecules and gradually orienting the same, in response to the electrostatic field, there is an increase in the (temporary) formation of carbonic acid inside the water, and the resulting water has been found to be more highly carbonated. In addition, the water molecules have been found to retain a bond with the carbon dioxide molecules that mitigates dispersion of the carbon dioxide molecules, (i.e., bubbling, when the carbonated water is exposed to air during dispensing). As bonds are increased, the carbonization in water is higher and more durable over time, as the carbonated water sits in an open glass or bottle.

The electrostatic field created by the metal mesh tends to align the water molecules with respect to the electrostatic field because of the dipolar character of water molecules. The alignment could lead to longitudinal electrostriction causing water molecules to become denser and include cross-sectional dilation. The longitudinal electrostriction and cross-sectional dilation increases the probability of the partially negative charged water molecules interacting with the carbon dioxide molecules, which possess partially positive charged carbon moieties, and could be present in the system, to form stable carbonic acid molecules.

In the illustrated embodiments, the micro mesh nets are formed of thin stainless-steel strands of approximately 2 to 100μ in diameter, having an open mesh area of approximately 5 to 800$\mu^2$. However, it is anticipated that the micro mesh net may be formed of other materials, and the size of the strands/open mesh areas, may be varied as suited for specific pressure levels, flow rates, desired levels of carbonation and other factors.

When the carbonated water is discharged from the first carbonated chamber, the output is communicated to the second carbonation chamber, where the carbonation level is further enhanced. As noted above, while the first carbonated chamber may or may not include beads, as shown in FIG. 3, the second carbonation chamber may further include glass beads having microscopic surface irregularities that can trap water and carbon dioxide molecules (still in the form of (CO2aq). Such trapping mitigates the activity of the molecules in the carbonated water, particularly the larger carbon dioxide molecules, making it easier for other molecules to combine with the trapped molecules. Highly active water molecules that are trapped on the surface of the irregularities of the glass beads also become more available for bonding with free carbon dioxide molecules, then would be the case if the water molecules were free-flowing in the carbonated water. In accordance with that process the glass beads, having specific diameters (from 0.5 mm to 5 mm), serve as surface catalysts which work by increasing the percentage of molecular collisions that have the correct orientation to facilitate bonding.

It is anticipated that if 10% of collisions have favorable molecular orientation initially, adding surface catalysts into the flow can increase that to 30%. This means that the rate at which the formation of bonds between water molecules and carbon dioxide molecules will triple (if all other conditions remain the same). This means that the water molecules and carbon dioxide molecules have a substantially greater chance to bond when one of them is more stationary than the other, rather than both moving freely.

In comparison to the water and carbon dioxide molecules, the surface catalyst has a massive amount of surface area relative to the size of the water and carbon dioxide molecules. The seemingly smooth surface of glass beads, is quite bumpy at the atomic scale. That bumpiness, or surface irregularity, serves to capture and therefore stabilize, water molecules. This enhances the ability of water compatible molecules to bond to the captured water molecules.

The surface irregularities in the glass beads may match with, or otherwise be compatible with, the shape or spacing of the carbon dioxide molecules and/or the water molecules. As such, a carbon dioxide molecule, for example, may bump into the surface of the glass bead and stick to it. Once the carbon dioxide is no longer moving freely, the likelihood of a well-oriented collision with a water molecule, i.e., in which the molecule may bond, goes up dramatically. In this way, the surface catalyst helps to produce more carbonic acid and fewer free carbon dioxide molecules, resulting in a carbonation that persists for a much longer lasting period of time.

Once bonded, the impact of other colliding molecules can knock the trapped carbonic acid molecules free of the glass bead surface. The water molecules or carbon dioxide molecules, trapped but unbounded, may similarly be released or knocked free. However, the release of the carbonated molecules is expected to be of minimal significance as another passible molecule will likely be quickly trapped. Once a water molecule and a carbon dioxide molecule are hydrogen bonded to form carbonic acid, they are more easily retained in carbonated water. This leads to a carbonated beverage which stays carbonated for longer and retains the preferred taste profile.

In the presently preferred embodiment, the carbonation apparatus 10 includes two carbonation chambers 20, as depicted in FIGS. 1 and 2. However, other embodiments may contain a different number of carbonation chambers, e.g., three or more. The carbonation chambers may have various dimensions. In one presently preferred embodiment, each carbonation chamber possesses an internal volume of between 2 and 400 cubic centimeters.

FIG. 4 illustrates carbonation apparatus 20, including carbonation chambers 21 and 23. Carbonation chamber 21 defines an interior having a cylindrical micromesh net. Carbonation chamber 23 defines an interior having a plurality of glass beads within the net. In the input flow through carbonation chamber 21 passes through input port 22 and out of output port 24. The flow through carbonation chamber number two passes through input port 26 and out of the output port 28.

Figure 4A:
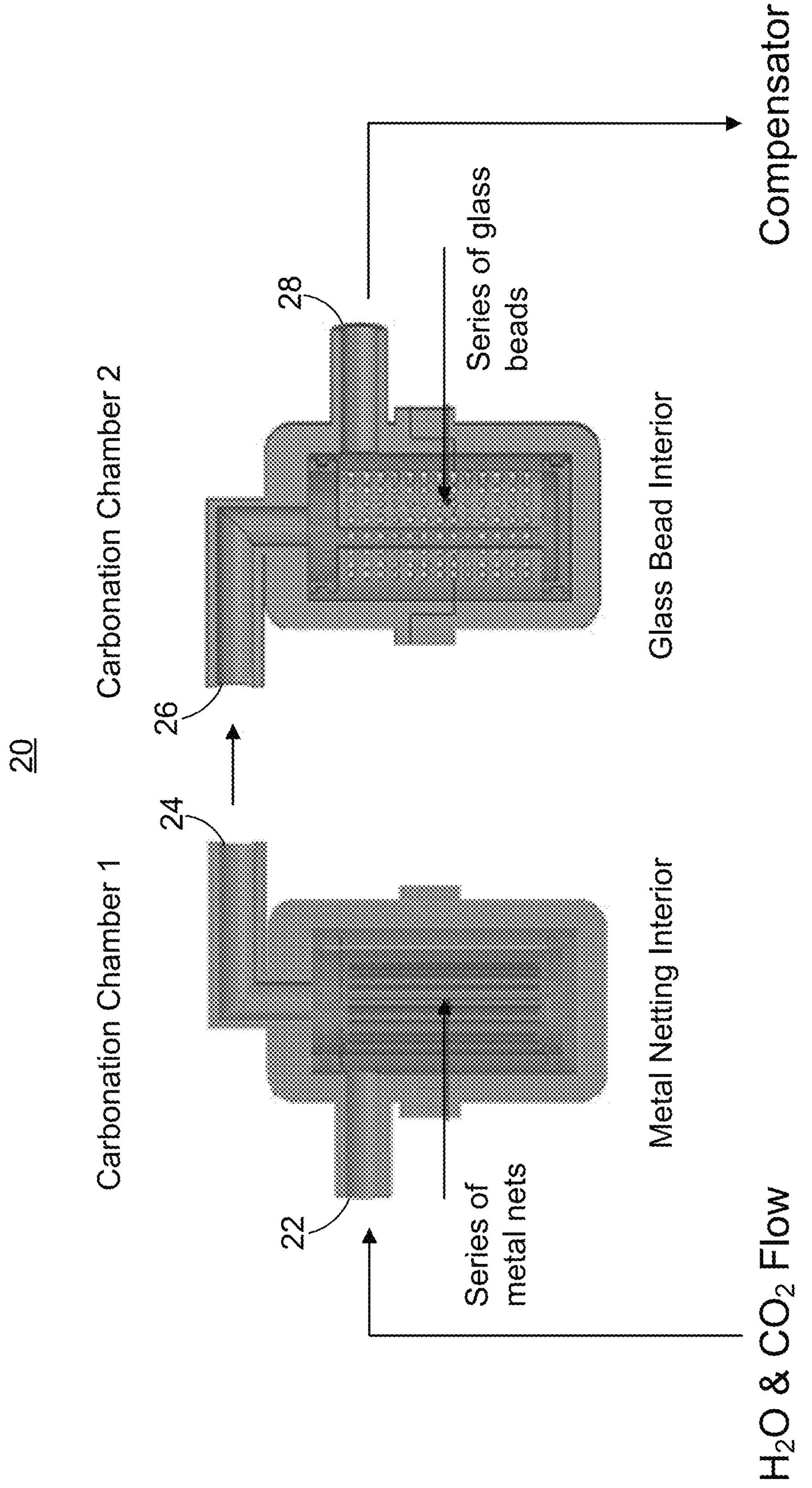
FIG. 4*a* illustrates one embodiment of the carbonation chambers.
Figure 4B:
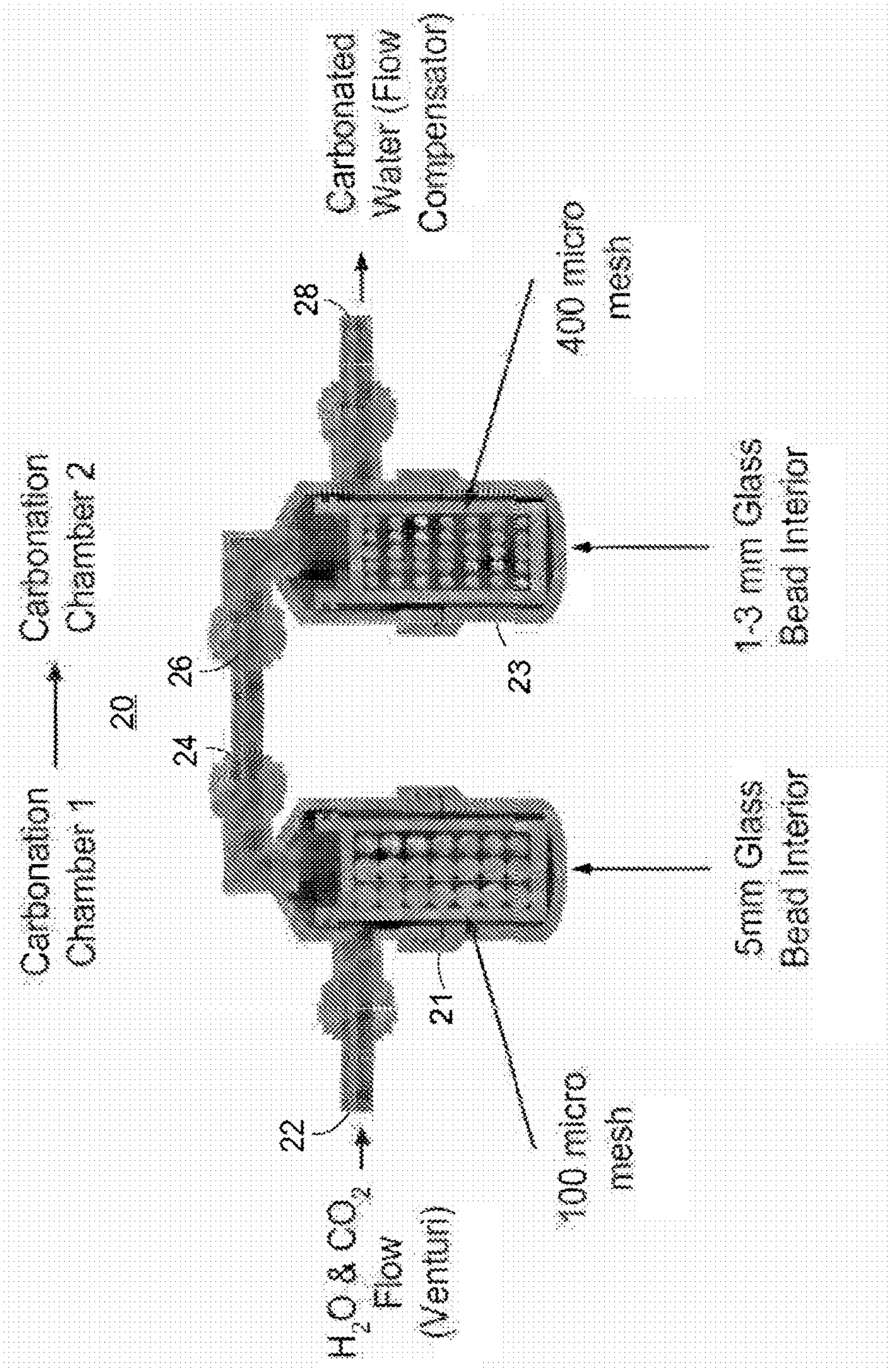
FIG. 4*b* illustrates a second embodiment of the carbonation chambers.

The carbonation apparatus 20 shown in FIG. 4*b* includes carbonation chambers 21 and 23. Carbonation chamber 21 defines an interior having a 100 μm micromesh net and a plurality of 5 mm glass beads disposed within the carbonation chamber 21. Carbonation chamber 23 defines a 400 μm micromesh net, within which are a plurality of 1 to 3 mm glass beads.

Figure 5:
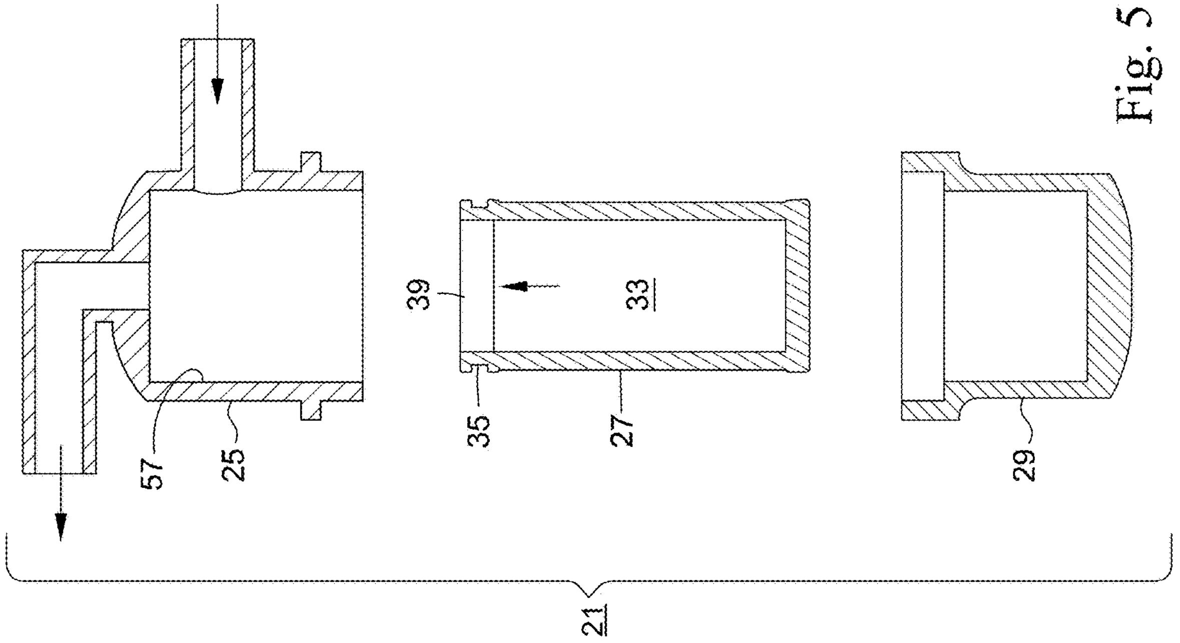
FIG. 5 is an exploded view of the carbonation chamber.
Figure 7A:
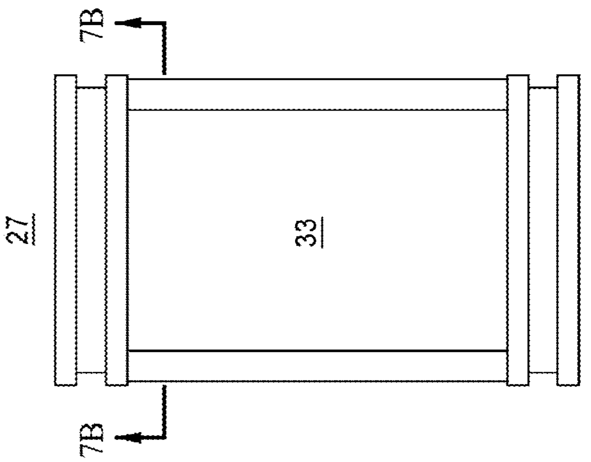
FIGS. 7*a* and 7*b* are views of the mesh filter used in carbonation chamber.
Figure 7B:
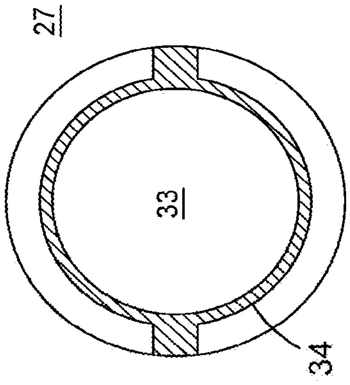

FIGS. 5 and 6 illustrate an exploded view of exemplary carbonation chamber 21, having a cap portion 25, a base portion 29, and a cartridge 27 disposed within a chamber defined by the cap portion 25 and the base portion 29.

The cartridge 27 defines a micromesh net 34 about the interior chamber 33, in which the glass beads 38 may be disposed. The cartridge 27 is disposed in fluid sealing engagement with the cap 25, by engagement of the sealing member 35 to the side wall 19 of cap 25. As shown at FIG. 6*b*, an open grate 39 may be provided at one end of the cartridge 27, to facilitate fluid flow between the interior of the cartridge 27 and the carbonation chamber input port, to facilitate fluid flow through and about the beads.

Figure 6A:
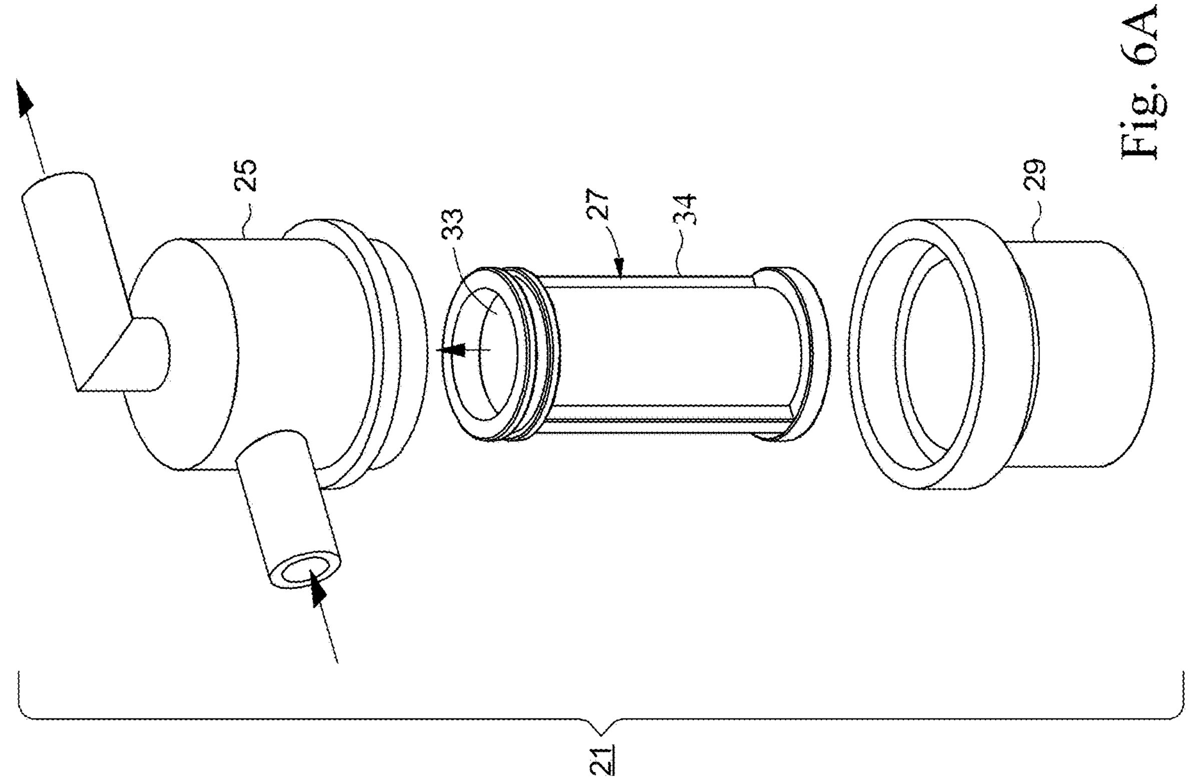
FIG. 6*a* is an exploded perspective view of the carbonation chamber.
Figure 6B:
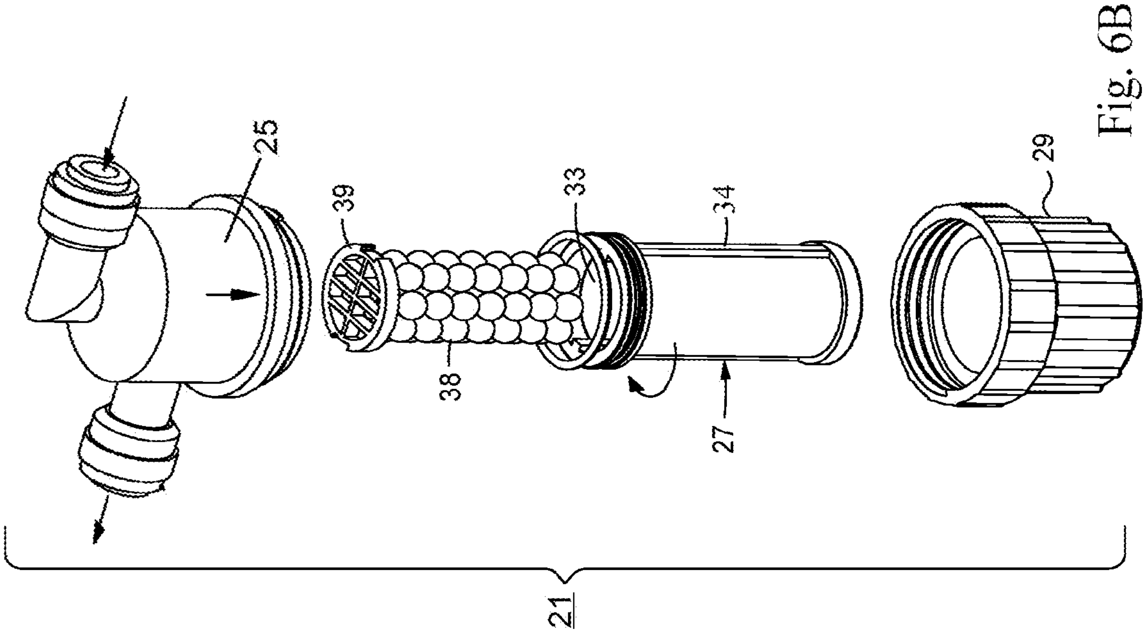
FIG. 6*b* is an exploded perspective view of the carbonation chamber with beads disposed with the micromesh netting.

Fluid flow into and out of the carbonation chambers may be varied to enter or exit the cartridge through the upper port or the side port, as may be illustrated by a comparison of the flow paths in FIGS. 6*a* and 6*b*.

In the presently preferred embodiment, each carbonation chamber, is of substantially cylindrical geometry, as shown at FIGS. 4-7. Each carbonation chamber defines a hollow cylindrical region into which a cylindrical, micromesh net of metallic material is disposed. Water entering the first carbonation chamber passes through the micromesh nets, and then is communicated to the next (second) carbonation chamber. The first carbonation chamber may or may not include glass beads and second carbonation chamber is expected to include glass beads, as illustrated in FIGS. 4*a*, 4*b*, and 6*b*. The glass beads 38 are preferably free-floating within the carbonation chamber, inside the micromesh net. The second carbonation chamber may include a similar net as the first carbonation chamber, but preferably with a finer micromesh net and smaller diameter beads, as shown at FIG. 4*b*. The construction and functionality of the carbonation chambers and the flow compensator are described in more detail below.

Carbonated water output from the second carbonation chamber may be communicated to a flow compensator, which is further described below. Different embodiments of suitable flow compensators are set forth at FIGS. 8-10 and 12-13. Alternatively, the flow compensator may be implemented by commercially available apparatus, such as Everpure EV312493 flow compensator or the CM Becker In Line Flow Control Compensator (model number D1235).

The carbonated water output from the second carbonation chamber is typically at a higher level of carbonation than the output from the first carbonation chamber, despite the flow of the molecules remaining substantially indiscriminate. Flow compensators, function to reduce the turbulent flow and increase the semi-laminar flow of the highly carbonated water, instantaneously bringing the pressure of the mixture down to atmospheric pressure. The flow compensator additionally functions to regulate the pressure and flow of the carbonated water to levels suitable for input to a point of use dispenser, e.g., to a pressure of 15 psi and a flow rate between 0.5 to 1.6 GPM. Different embodiments of a flow compensator useful in conjunction with the present invention are shown at FIGS. 8-10 and 12-13.

Figure 8:
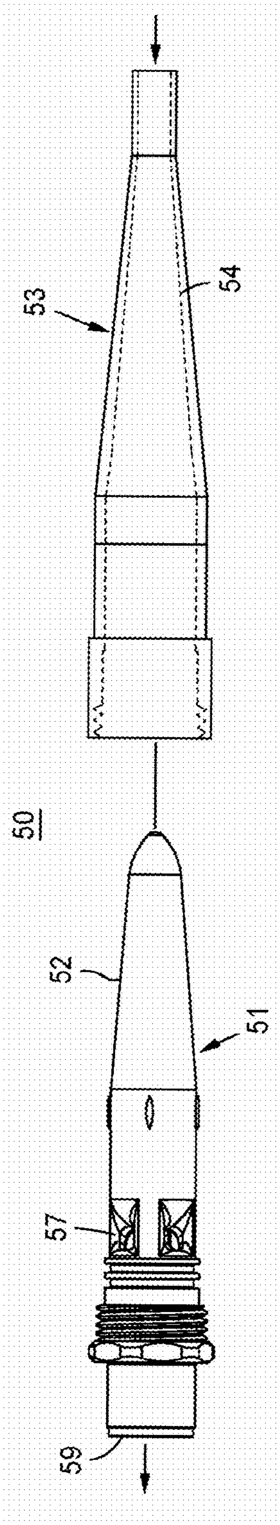
FIG. 8 illustrates a first embodiment of the flow compensator.
Figure 10:
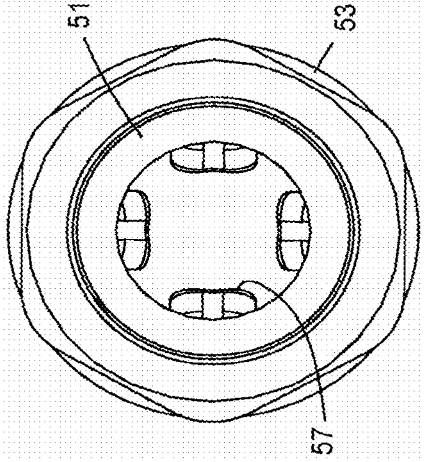
FIG. 10 is an end view of the flow compensator shown in FIG. 8.
Figure 9:
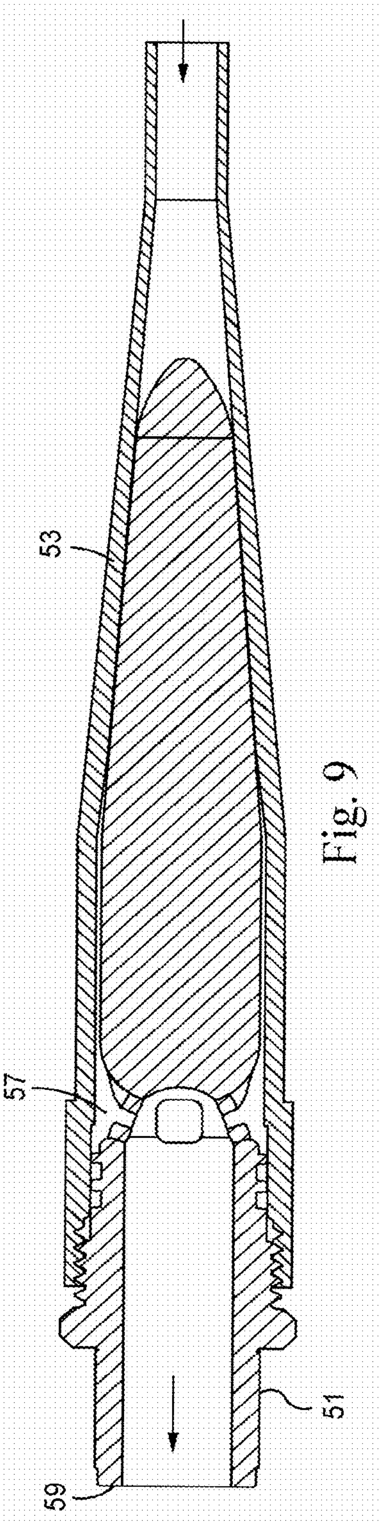
FIG. 9 is a cross-sectional view of the flow compensator shown in FIG. 8.
Figure 12:
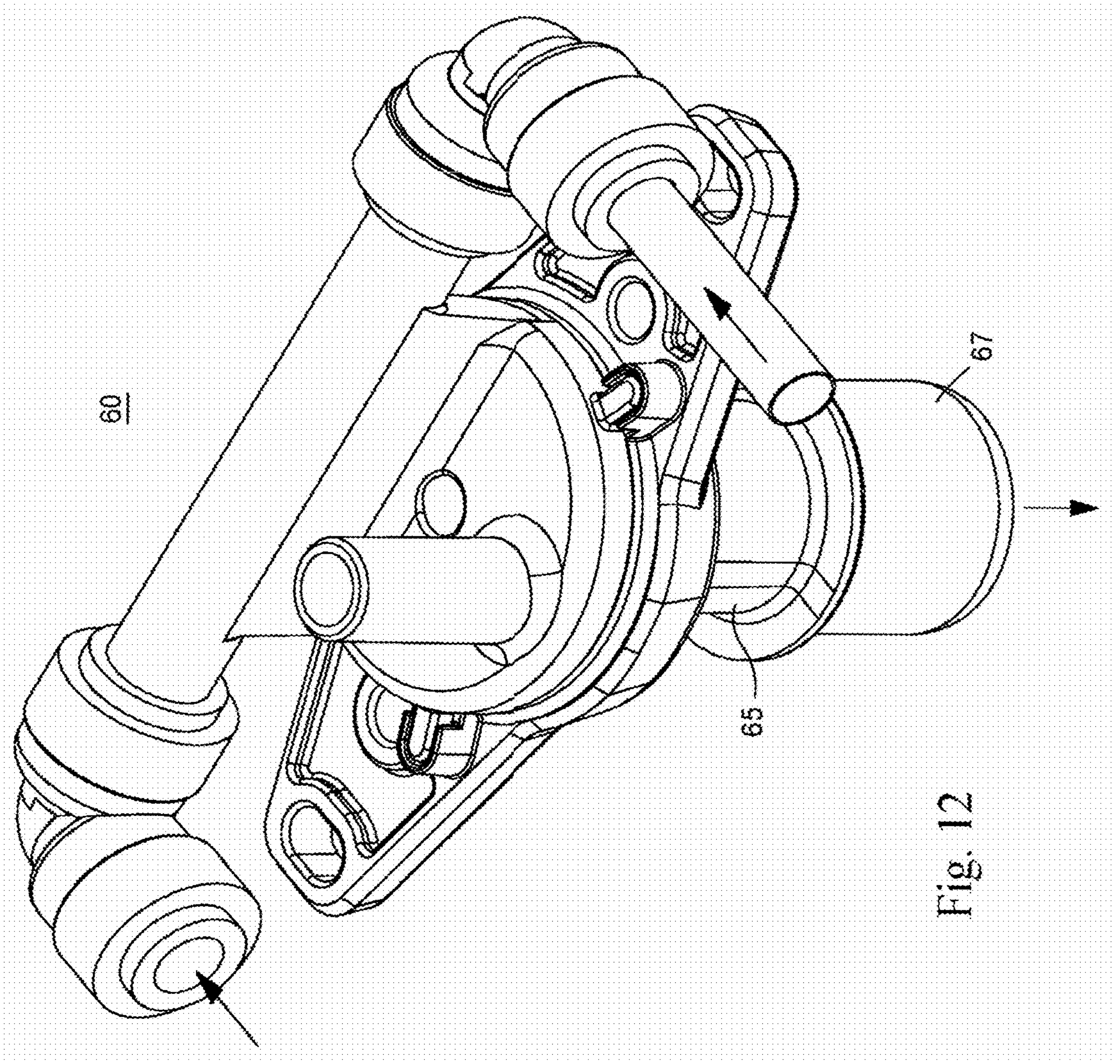
FIG. 12 is a perspective view of a second alternate embodiment of the flow compensator.
Figure 13:
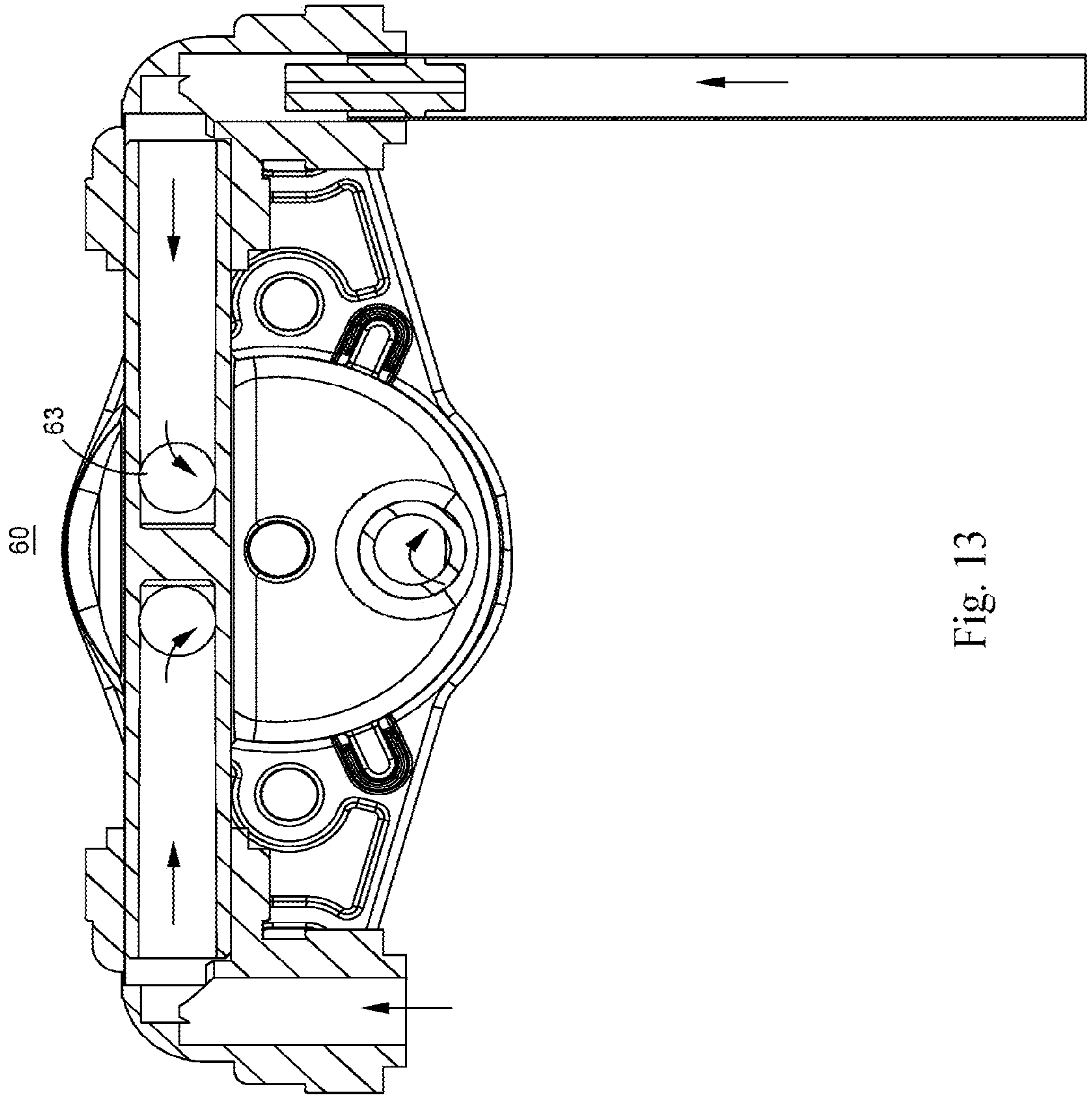
FIG. 13 is a top view of the flow compensator shown in FIG. 12.

In the embodiment shown at FIGS. 8-10, the flow compensator 50 consists of an elongated body 51 having three distinctive elements: (i) first a flow restrictor area 52, immediately followed by (ii) an expansion area having, in most cases, (iii) an aerator element 57. The flow compensator further includes an outer shell 53 into which an elongated body (regulator) is inserted. Carbonated water enters the flow compensator outer shell 53 and flows circumferentially about the extended body 51 by way of a channel that extends between the extended body 51 and the inner wall 54 of the outer shell 53 towards the output 59 of the compensator 50. Rotation of the extended body 51 into the outer shell 53 serves as a variable flow restrictor.

Other embodiments may include a compensator that functions using the same physics principles (reducing the pressure and stabilizing the flow) but with a different geometry. The embodiment shown at FIGS. 12-13 includes a flow compensator 60 wherein a flow restrictor 63, placed downstream of the carbonation chambers, is followed by an expansion chamber 65 and an aerator 67. The flow compensator 60 may be implemented in the dispensing apparatus, in order to dispense stable flows of sparkling water, syrup and/or hot water and dispense them at atmospheric pressure.

The carbonation levels and other characteristics of the carbonated water output from the flow compensator is described in the chart set forth at FIGS. 11*a* and 11*b*. Those figures compare the output of the carbonated water of the present invention to the output measured from other commercially available dispensing systems, as well as from carbonated water from bottles of selected carbonated water products.

As shown in FIGS. 11*a* and 11*b*, the carbonated water produced in accordance with the present invention exhibits a pH 3.6, at atmospheric pressure, and remains highly carbonated for a longer period of time than has been found to be characteristic of the other commercially available products tested. As such, the carbonation level in the present invention has been found to produce highly carbonated water having a high level of carbonation stability over extended periods of time.

The particulars shown herein are by way of example and are only for purposes of illustrative discussion. They are presented to provide what is believed to be the most useful and readily understood description of the principles and conceptual aspects of the various embodiments of the methodology and apparatus for providing a stabilized, highly carbonated beverage. In this regard, no attempt is made to show any more detail than is necessary to provide a fundamental understanding of the different features of the various embodiments and the descriptions given with the drawings to make apparent to those skilled in the art, how these may be implemented in practice.

As such, the above description is given by way of example and not limitation. Given the above disclosure; it is determined that one who is skilled in the art and trade could devise variations that are within the scope and spirit of the invention disclosed herein. This would include various ways of enhancing and stabilizing carbon dioxide levels of water. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A carbonation apparatus, comprising:

a carbonation chamber comprising an input port and an output port, wherein the input port is configured to receive a mixed flow comprising water molecules and carbon dioxide molecules;

a cartridge comprising a micromesh net arranged within the carbonation chamber such that the cartridge is in fluid communication with the mixed flow, wherein the micromesh net is configured to facilitate bonding of the water molecules with the carbon dioxide molecules by polarizing the water molecules passing through the micromesh net; and a plurality of beads disposed within the carbonation chamber and configured to capture the carbon dioxide molecules to facilitate bonding of the captured carbon dioxide molecules with the polarized water molecules.

2. The carbonation apparatus of claim 1, wherein the micromesh net comprises a metal.

3. The carbonation apparatus of claim 2, wherein the micromesh net comprises stainless steel.

4. The carbonation apparatus of claim 2, wherein the micromesh net comprises a mesh size in a range of 5 microns to 800 microns.

5. The carbonation apparatus of claim 4, wherein the mesh size is in a range of 100 microns to 800 microns.

6. The carbonation apparatus of claim 1, wherein the cartridge comprises a cylindrical configuration.

7. The carbonation apparatus of claim 1, wherein the carbonation chamber comprises an upper end, a lower end, and a sidewall, and wherein the input port is arranged on one of the sidewall and the upper end, and wherein the output port is arranged on the other of the sidewall and the upper end.

8. The carbonation apparatus of claim 1, further comprising a flow compensator arranged at the output port of the carbonation chamber, wherein the flow compensator is configured to adjust a flow rate of the mixed flow.

9. The carbonation apparatus of claim 1, further comprising a mixing apparatus in fluid communication with the input port of the carbonation chamber, wherein the mixing apparatus is configured to combine a flow of water and a flow of carbon dioxide to provide the mixed flow.

10. A carbonation apparatus, comprising:

a carbonation chamber comprising an input port and an output port, wherein the input port is configured to receive a mixed flow comprising water molecules and carbon dioxide molecules;

a cartridge arranged within the carbonation chamber such that the cartridge is in fluid communication with the mixed flow, wherein the cartridge comprises a micromesh net, and wherein the cartridge defines a cavity; and a plurality of beads disposed within the cavity of the cartridge, wherein the plurality of beads are configured to capture carbon dioxide molecules to facilitate bonding of the captured carbon dioxide molecules with water molecules.

11. The carbonation apparatus of claim 10, wherein each of the plurality of beads comprises glass.

12. The carbonation apparatus of claim 10, wherein each of the plurality of beads comprises an outer surface having irregularities configured to capture the carbon dioxide molecules.

13. The carbonation apparatus of claim 10, wherein each of the plurality of beads has a diameter in a range of 0.5 mm to 3 mm.

14. The carbonation apparatus of claim 10, wherein the micromesh net comprises a metal.

15. The carbonation apparatus of claim 14, wherein the micromesh net comprises a mesh size in a range of 5 microns to 800 microns.

16. A carbonation apparatus, comprising:

a first carbonation chamber comprising an input port and an output port, wherein the input port is configured to receive a mixed flow comprising water molecules and carbon dioxide molecules;

a first cartridge arranged within the first carbonation chamber such that the first cartridge is in fluid communication with the mixed flow, wherein the first cartridge comprises a micromesh net;

a second carbonation chamber having an input port and an output port, wherein the input port of the second carbonation chamber is in communication with the output port of the first carbonation chamber; and a second cartridge arranged within the second carbonation chamber, wherein the second cartridge comprises a second micromesh net arranged within the second carbonation chamber, wherein a mesh size of the second micromesh net is smaller than a mesh size of the first micromesh net.

17. The carbonation apparatus of claim 16, wherein at least one of the first cartridge and the second cartridge comprises a plurality of beads.

18. The carbonation apparatus of claim 16, wherein the first cartridge comprises a first plurality of beads and the second cartridge comprises a second plurality of beads, and wherein a bead of the second plurality of beads has a diameter that is smaller than a diameter of a bead of the first plurality of beads.

19. The carbonation apparatus of claim 16, wherein the first micromesh net and the second micromesh net each comprise a metal.

20. A carbonation apparatus, comprising:

a first carbonation chamber comprising an input port and an output port, wherein the input port is configured to receive a mixed flow comprising water molecules and carbon dioxide molecules;

a first cartridge arranged within the first carbonation chamber such that the first cartridge is in fluid communication with the mixed flow, wherein the first cartridge comprises a first micromesh net and a first plurality of beads;

a second carbonation chamber having an input port and an output port, wherein the input port of the second carbonation chamber is in communication with the output port of the first carbonation chamber; and a second cartridge arranged within the second carbonation chamber, wherein the second cartridge comprises a second micromesh net and a second plurality of beads, and wherein a bead of the second plurality of beads has a diameter that is smaller than a diameter of a bead of the first plurality of beads.

* * * * *